US007860232B2

United States Patent
Huang (10) Patent No.: US 7,860,232 B2
(45) Date of Patent: Dec. 28, 2010

(54) METHOD AND SYSTEM FOR MIGRATING A TELEPHONE SERVICE FROM A FIRST LOCAL EXCHANGE CARRIER TO A SECOND LOCAL EXCHANGE CARRIER

(75) Inventor: Brian S. Huang, Fairfax, VA (US)

(73) Assignee: Verizon Business Global LLC, Ashburn, VA (US)

( * ) Notice: Subject to any disclaimer, the term of this patent is extended or adjusted under 35 U.S.C. 154(b) by 1963 days.

(21) Appl. No.: 10/846,607

(22) Filed: May 17, 2004

(65) Prior Publication Data

US 2005/0111643 A1 May 26, 2005

Related U.S. Application Data

(60) Provisional application No. 60/523,631, filed on Nov. 21, 2003.

(51) Int. Cl.
*H04M 3/22* (2006.01)
*H04M 7/00* (2006.01)
(52) U.S. Cl. .............. 379/221.13; 379/26.01; 379/219; 379/221.02
(58) Field of Classification Search ........... 379/26.01, 379/221.13, 221.02, 219
See application file for complete search history.

(56) References Cited

U.S. PATENT DOCUMENTS

| 5,862,209 | A | * | 1/1999 | Kapsales | 379/214.01 |
| 6,130,941 | A | * | 10/2000 | Nimmagadda et al. | 379/221.1 |
| 6,934,528 | B2 | * | 8/2005 | Loureiro et al. | 379/121.02 |
| 6,983,037 | B2 | * | 1/2006 | Argo | 379/221.13 |
| 2002/0159580 | A1 | * | 10/2002 | Bell et al. | 379/221.13 |

* cited by examiner

*Primary Examiner*—Ahmad F Matar
*Assistant Examiner*—Nafiz E Hoque (57) ABSTRACT

A method and system are provided for migrating telephone service. An order is received to migrate telephone service to a competitive local exchange carrier for at least one telephone line assigned to a customer. An account is created for the order. At least one sub-account associated with the account may be created. Each sub-account may be associated with a different combination of a local exchange carrier, from which the telephone service is being migrated, and a billing telephone number. A first telephone migration order may be generated and sent for migrating at least one telephone line associated with a first combination of a local exchange carrier and a billing telephone number.

24 Claims, 6 Drawing Sheets

METHOD AND SYSTEM FOR MIGRATING A TELEPHONE SERVICE FROM A FIRST LOCAL EXCHANGE CARRIER TO A SECOND LOCAL EXCHANGE CARRIER

RELATED APPLICATIONS

This application claims priority under 35 U.S.C. §119 based on U.S. Provisional Application Ser. No. 60/523,631, entitled "METHOD AND SYSTEM FOR MIGRATING A TELEPHONE SERVICE FROM A FIRST LOCAL EXCHANGE CARRIER TO A SECOND LOCAL EXCHANGE CARRIER," inventor, Brian S. Huang, filed Nov. 21, 2003, the disclosure of which is incorporated herein by reference.

TECHNICAL FIELD

Systems and methods consistent with the principles of the invention relate generally to providing a telephone service and, more particularly, to migrating the telephone service from one local exchange carrier to another.

BACKGROUND OF THE INVENTION

A competitive local exchange carrier (CLEC) may provide local telephone service to telephones in a local telephone company's service area as an alternative to the local telephone company providing the service. Although a CLEC may provide the telephone service to telephones in the local telephone company's service area, the local telephone company provides the CLEC with access to the telephones in the local telephone company's area via the local telephone company's end office. Because the local telephone company charges each CLEC an access fee for each phone in the telephone company's service area to which service is provided by the respective CLEC, each CLEC must maintain an account with the local telephone company.

Often, business telephone users have multiple phone lines. A number of different local exchange carriers (LECs) may provide telephone service for the multiple phone lines of a business. For example, company X may have ten phone lines, five lines being provided with phone service by LEC-1 and the remaining five lines being provided with phone service from LEC-2. Suppose company X wishes to change its phone service to LEC-3, such that all ten phone lines will be provided phone service from LEC-3, which happens to be a CLEC. Because the local phone company associates the first five phone lines with an account for LEC-1 and the second five phone lines with an account for LEC-2, to migrate the phone service for all ten of company X's telephone lines, a customer representative of LEC-3 may enter an order with the local phone company to migrate the first five phone lines to LEC-3, wait for the completion of the first order, enter a second order with the local phone company to migrate the second five phone lines to LEC-3, wait for completion of the second order, and then notify the telephone customer (company X) that the phone service for all ten lines has been migrated to LEC-3.

Similarly, business telephone users often have more than one billing telephone number (BTN) with their telephone service provider (LEC). When multiple phones are provided with phone service from one LEC, but the customer has multiple BTNs associated with the multiple phones, a customer representative of an LEC may enter an order with the local phone company to migrate the phone lines associated with one BTN to the LEC, wait for the completion of the first order, enter a second order for the phone lines associated with a second BTN with the local phone company to migrate the second group of phone lines to the LEC, wait for completion of the second order, etc . . . and then notify the telephone customer (company X) that the phone service for all the groups phone lines has been migrated to the LEC.

Because multiple orders may be entered to request migration of a single company's phone service to one CLEC, the average handling time per order may be longer than if only one order was entered. Further, if the local phone company has a problem with the first order, this may cause a delay in processing a subsequent order.

SUMMARY OF THE INVENTION

In a first aspect, a method for migrating telephone service is provided. An order is received to migrate telephone service to a competitive local exchange carrier for at least one telephone line assigned to a customer. An account is created for the order. At least one sub-account associated with the account is created. Each sub-account is associated with a different combination of a local exchange carrier, from which the telephone service is being migrated, and a billing telephone number. A first telephone migration order is generated and sent for migrating ones of the at least one telephone line associated with a first combination of a local exchange carrier and a billing telephone number. The first telephone migration order corresponds to at least part of the order.

In a second aspect, an apparatus is provided for placing an order to migrate telephone service to a competitive local exchange carrier for a group of telephone lines assigned to a customer. The apparatus includes a memory and a processor configured to communicate with the memory. The memory includes a group of instructions for the processor, such that when the instructions are executed by the processor, the apparatus is configured to receive an order to migrate the telephone service, for the group of telephone lines assigned to a customer, from at least one local exchange carrier to a single competitive local exchange carrier, create an account corresponding to the order, create at least one sub-account associated with the account, each one of the sub-accounts corresponding to a different combination of a local exchange carrier, from which the telephone service is being migrated, and a billing telephone number, and send at least one telephone migration order to a local telephone company processing system, each of the at least one local telephone company order corresponding to a different one of the sub-accounts.

In a third aspect, a system is provided for ordering a migration of telephone service for a customer from at least one local exchange carrier to a single competitive local exchange carrier. The system includes a first subsystem. The first subsystem is configured to receive an order to migrate the telephone service for the customer from of the at least one local exchange carrier to the single competitive local exchange carrier, create an account for the order, create at least one sub-account associated with the account, each one of the at least one sub-account corresponding to a different combination of a local exchange carrier and a billing telephone number, and send of the at least one telephone migration order to a local telephone company processing system, each one of the at least one telephone migration order corresponding to a different one of the sub-accounts.

In a fourth aspect, a machine-readable medium including instructions for a processor is provided. When the instructions are read and executed by the processor, the processor is configured to receive an order to migrate telephone service from at least one local exchange carrier to a competitive local exchange carrier for a group of telephone lines assigned to a customer, create an account for the order, create at least one sub-account associated with the account, each sub-account corresponds to a different combination of a local exchange carrier and a billing telephone number, and send at least one telephone migration order to a local telephone company processing system. A number of the telephone migration orders is equal to a number of the sub-accounts.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Exemplary System

Figure 1:
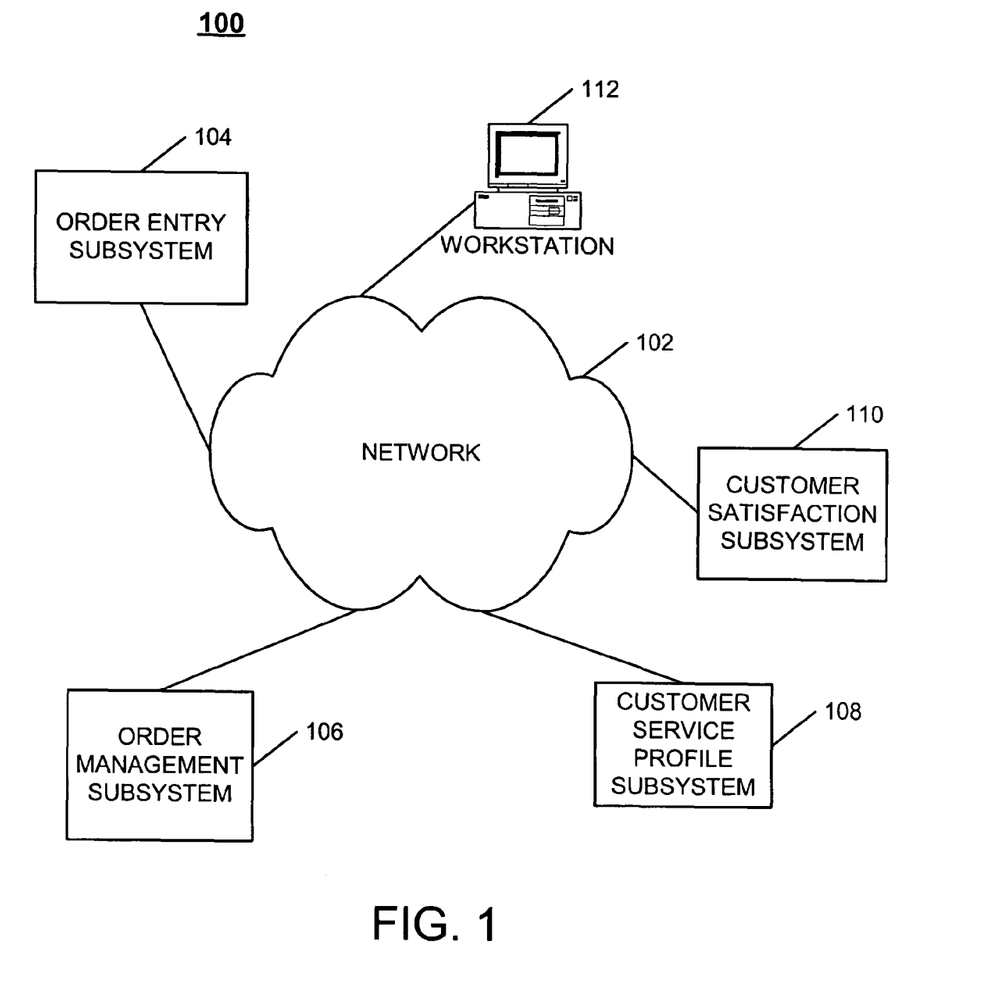
FIG. 1 illustrates an exemplary system for receiving an order to migrate a customer's telephone service from at least one LEC to a CLEC.

FIG. 1 illustrates an exemplary system 100 consistent with the principles of the invention. System 100 may include a network 102, an order entry subsystem 104, an order management subsystem 106, a customer service profile subsystem 108, a customer satisfaction subsystem 110 and a workstation 112. Order entry subsystem 104, order management subsystem 106, customer service profile subsystem 108, customer satisfaction subsystem 110 and workstation 112 may be connected to network 102 via wired, wireless or optical connections. Network 102 may include a local area network (LAN) or a network of networks, such as the Internet.

Workstation 112 may be a personal computer (PC). A user, such as a customer service representative for a CLEC, may enter order information, using workstation 112, to migrate telephone service for a customer from one or more other LECs to the CLEC. Workstation 112 may execute software that presents a graphical user interface (GUI) or other interface to the user, such that the user may enter the order information for a customer.

The order information may include automatic number identifiers (ANIs) for each telephone line to be migrated. An ANI identifies a calling telephone number associated with the calling telephone. Workstation 112 may then send the order information to order entry subsystem 104 via network 102. Workstation 112 may include a database of ANIs, associated LEC account numbers and BTNs. The database may be maintained by the local telephone company. Alternatively, workstation 112 may access the local telephone company's database of ANIs via network 102 or via a modem. Workstation 112 may then generate an order request including the order information and information that indicates from which LEC each telephone number is being migrated and a BTN associated with the phone numbers.

Alternatively, workstation 112 may execute an application, such as an Internet browser to contact order entry subsystem 104. After contacting order entry subsystem 104, order entry subsystem 104 may download an application, such as a JAVA applet, to the browser executing on workstation 112 to cause workstation 112 to request order information from the user, receive the order information and forward the order information to order entry subsystem 104.

In yet another alternative, a person representing a customer or entity may call an LEC representative to request telephone service migration. The LEC representative may be automatically provided with the entity's ANI from information included with call signaling information for the phone call. Workstation 112, associated with the LEC representative, may automatically access the local telephone company's database to identify the LEC and BTN information corresponding to the ANI information.

Order entry subsystem 104 may be implemented by a computer, such as a mainframe computer, mini-computer, or a PC. In one implementation consistent with the principles of the invention, order entry system 104 is implemented by a mainframe computer. Order entry subsystem 104 may receive order information from workstation 112 via network 102. Alternatively, workstation 112 may have a direct connection with order entry subsystem 104 via a wired, wireless, or optical connection. Order entry subsystem 104 may send the order information to order management subsystem 106. In one implementation, order entry subsystem 104 may receive multiple orders over time, for example one hour, and may send the multiple orders, as a group of orders, to order management subsystem 106.

Order management subsystem 106 may be implemented by a computer, such as a mainframe computer, mini-computer, or a PC. In one implementation consistent with the principles of the invention, order management system is implemented by a mini-computer system. Order management subsystem 106 may receive one or more orders from order entry subsystem 104 via network 102. Order management subsystem 106 may create an account, called a cluster account, for an order and may create one or more sub-accounts associated with the cluster account. Each sub-account may correspond to a BTN within a LEC from which a customer wishes to migrate telephone service. Thus, for example, if a customer wishes to migrate telephone service for phone lines 1-5 with a first BTN from LEC-1 and phone lines 6-10 with a second BTN from LEC-1 to the CLEC, order management subsystem 106 may create two sub-accounts associated with the cluster account. Order management subsystem 106 may then send the orders to the local telephone company so that access accounts may be set up with the local phone company for the phones to be serviced by the CLEC. Order management subsystem 106 may also send the orders to customer service profile subsystem 108. Alternatively, order management subsystem 106 may send the orders to customer service profile subsystem 108 in a different format than that which was sent to the local telephone company. For example, order management subsystem 106 may send a single message that includes detailed customer information and order information.

Customer service profile subsystem 108 may be implemented by a computer, such as a mainframe computer, mini-computer system or PC. In one implementation consistent with the principles of the invention, customer service profile subsystem 108 is implemented by a mini-computer system. Customer service profile subsystem 108 may receive orders or messages with detailed customer information and order information from order management subsystem 106, extract the detailed customer information and the order information and store the information in a customer database. Customer service profile subsystem 108 may also maintain the status of orders.

Customer satisfaction subsystem 110 may be implemented by a mainframe computer, mini-computer or a PC. In one implementation consistent with the principles of the invention, customer satisfaction subsystem is implemented by a mainframe computer. Customer satisfaction subsystem 110 may receive an order complete message from customer service profile subsystem 108 and may notify customers that their orders have been completed.

Although, FIG. 1 shows exemplary system 100 having one workstation 112, one order entry subsystem 104, one order management subsystem 106, one customer service profile subsystem 108 and one customer satisfaction subsystem 110, system 100 consistent with the principles of the invention may have more or fewer components than that illustrated in FIG. 1. For example, in some implementations consistent with the principles of the invention, order entry subsystem 104, order management subsystem 106, customer service profile subsystem 108 and customer satisfaction subsystem 110 may be implemented by a single physical computer system. In other implementations consistent with the principles of the invention, order management subsystem 106 and customer service profile subsystem 108 may be implemented by a single physical computer system, while order entry subsystem 104 and customer satisfaction subsystem 110 may be implemented by physically separate computer systems.

Exemplary Computer System

Figure 2:
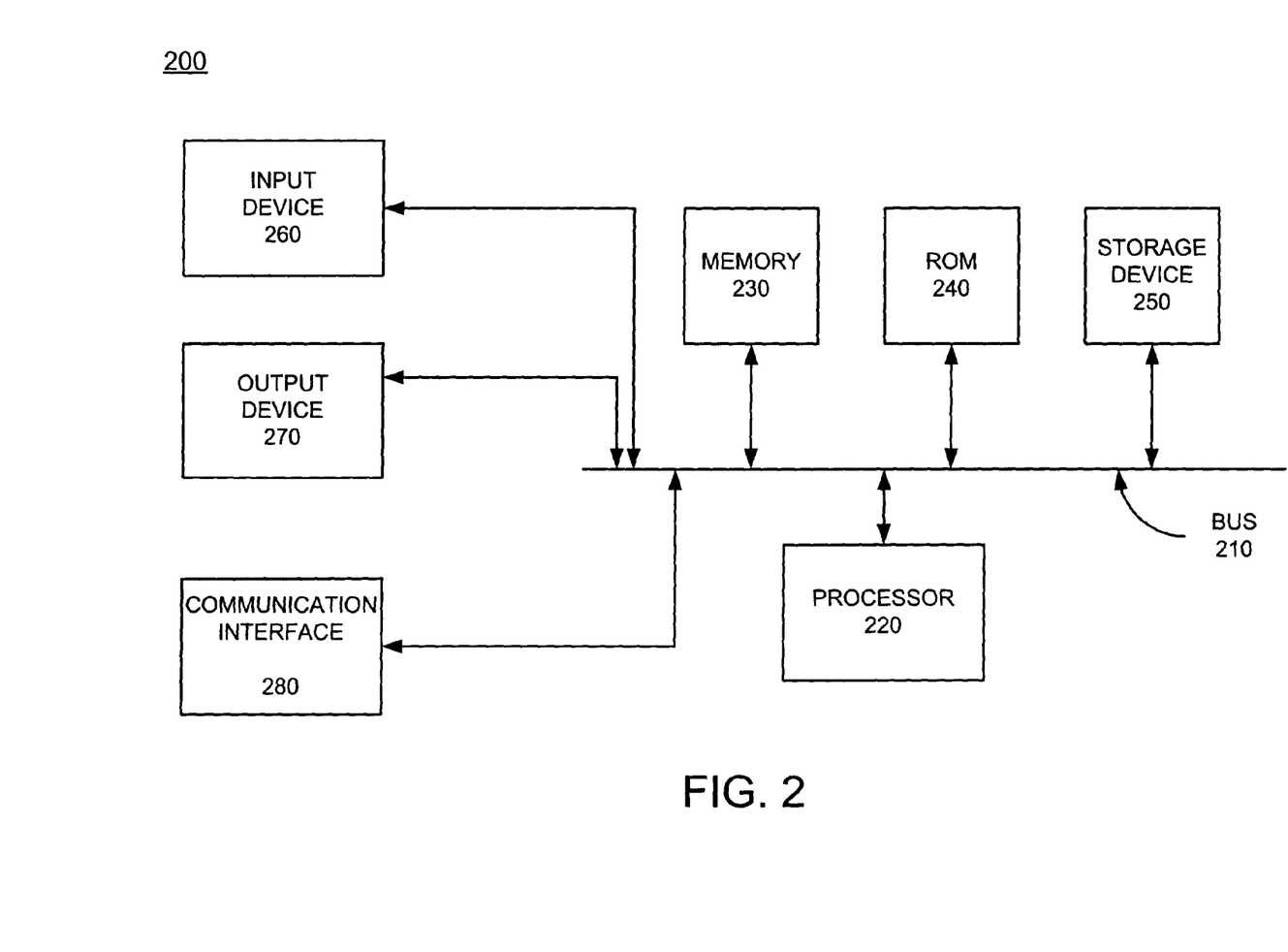
FIG. 2 is a functional block diagram of an exemplary computer system that may be used to implement a workstation, an order entry subsystem, an order management subsystem, a customer service profile subsystem and a customer satisfaction subsystem.

FIG. 2 illustrates an exemplary computer system 200. Each of order entry subsystem 104, order management subsystem 106, customer service profile subsystem 108, customer satisfaction subsystem 110 and workstation 112 may be implemented by a computer system, such as system 200. System 200 may include a bus 210, a processor 220, a memory 230, a read only memory (ROM) 240, a storage device 250, an input device 260, an output device 270, and a communication interface 280. Bus 210 permits communication among the components of system 200.

Processor 220 may include one or more conventional processors or microprocessors that interpret and execute instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of magnetic or optical recording medium and its corresponding drive, such as a magnetic disk or optical disk and its corresponding disk drive. In an implementation of customer service profile subsystem 108, storage device 250 may include a customer database.

Input device 260 may include one or more conventional mechanisms that permit a user to input information to system 200, such a keyboard, a mouse, a pen, a biometric mechanism, such as a voice recognition device, etc. Output device 270 may include one or more conventional mechanisms that output information to the user, including a display, a printer, one or more speakers, etc. Communication interface 280 may include any transceiver-like mechanism that enables system 200 to communicate via a network. For example, communication interface 280 may include a modem or an Ethernet interface for communicating via a local area network (LAN). Alternatively, communication interface 280 may include other mechanisms for communicating with other devices and/or systems via wired, wireless or optical connections.

A computer-readable medium may include one or more memory devices and/or carrier waves. Instructions may be read into memory 230 from another computer-readable medium, such as storage device 250, or from a separate device via communication interface 280.

Execution of the sequences of instructions contained in memory 230 may cause processor 220 to perform certain acts that will be described hereafter. In alternative implementations, hard-wired circuitry may be used in place of or in combination with software instructions to implement the present invention. In still other implementations, various acts may be performed manually, without the use of system 200. Thus, the present invention is not limited to any specific combination of hardware circuitry and software.

System Processing Overview

Figure 3:
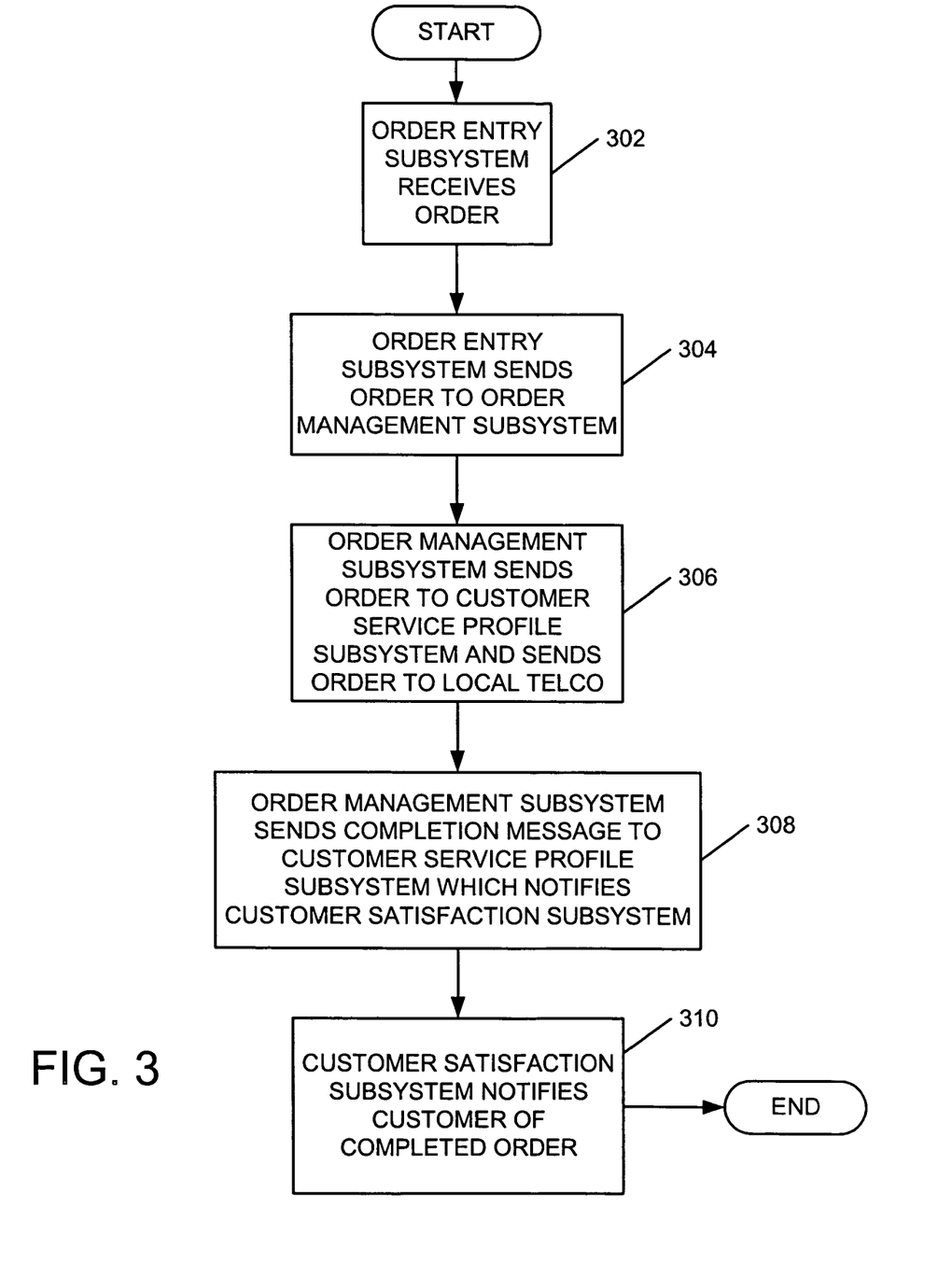
FIG. 3 is a flowchart that illustrates exemplary processing in an implementation consistent with principles of the invention.

FIG. 3 is a flowchart that illustrates processing in an exemplary implementation consistent with the principles of the invention. Processing may begin with order entry subsystem 104 receiving an order to migrate telephone service for a customer (act 302). Order entry subsystem 104 may send the order to order management subsystem 106 via network 102 (act 304). Order entry subsystem 104 may send the order to order management subsystem 106 as orders arrive or order entry subsystem 104 may accumulate orders and may send the accumulated orders to order management subsystem 106 periodically, for example, once per hour.

Order management subsystem 106 may then send the order to the local telephone company (i.e., a local telephone company processing system) and may send customer information and order information to customer service profile subsystem 108 (act 306). The order may be sent as multiple orders to the local telephone company, as described in more detail below. Order management subsystem 106 may also send the orders to the local telephone company via a modem, a wireless connection, an optical connection or a wired connection.

Order management subsystem 106 may receive order status messages, such as an order completion message, from the local telephone company via the telephone company processing system. Order management subsystem 106 may send the order status messages to customer service profile subsystem 108, which may send a notification to customer satisfaction subsystem 110 via network 102 (act 308).

Customer satisfaction subsystem 110 may receive the notification from customer service profile subsystem 108 via network 102 and may contact the customer. For example, when customer satisfaction subsystem 110 receives an order completion notification from customer service profile subsystem 108, customer satisfaction subsystem may print a postcard for mailing to the customer to notify the customer of the completion of the order. In other implementations consistent with the principles of the invention, customer satisfaction subsystem 110 may accumulate notifications and may print postcards periodically, for example, once per day. Alternatively, customer satisfaction subsystem may notify customers regarding their orders via other means, such as, for example, e-mail or by sending a voice mail to the customers.

Order Management Subsystem

Figure 4:
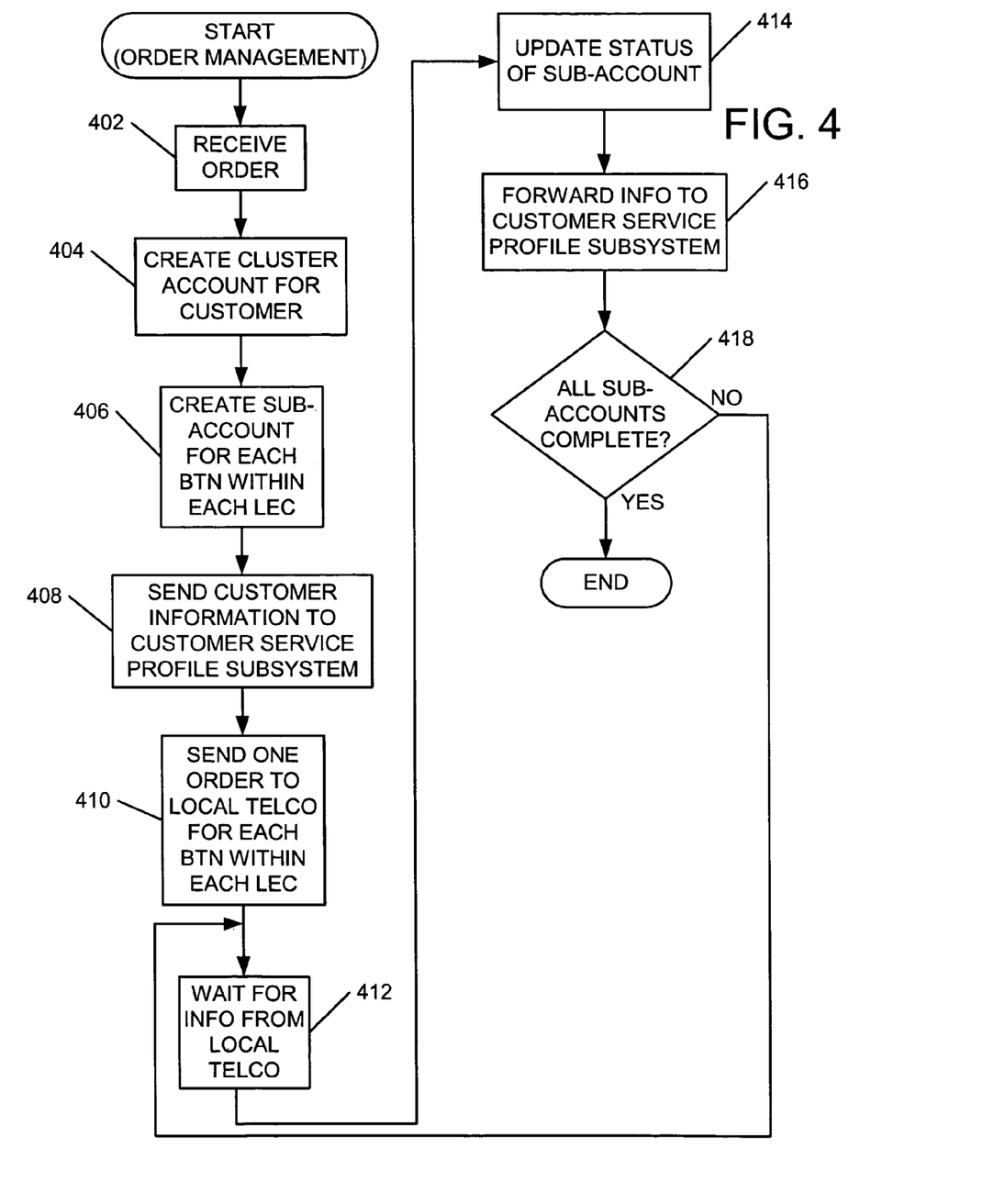
FIG. 4 is a flowchart that illustrates exemplary processing associated with the order management subsystem consistent with the principles of the invention.

FIG. 4 is a flowchart that illustrates exemplary processing associated with the order management subsystem 106 consistent with the principles of the invention. The flowchart of FIG. 4 illustrates exemplary processing of one customer order at a time to simplify the explanation of the exemplary processing. However, order management subsystem 106 may process multiple orders for different customers before receiving a status message for any of the previously processed orders.

Processing may begin with order entry management subsystem 106 receiving an order (act 402), which may have been sent by order entry subsystem 104 via network 102. The order may include an order to migrate telephone service from a single customer currently receiving telephone service from one or more LECs.

After receiving the order, order management subsystem 106 may create a cluster account (act 404). Order management subsystem 106 may then create a sub-account, associated with the cluster account, for each BTN within an LEC (act 406). If the order requests migration of phone service from only one BTN within one LEC, then order management subsystem 106 may create only one sub-account associated with the cluster account (act 406).

Order management subsystem 106 may then send customer information, including order information, to customer service profile subsystem 108 (act 408) and may send one order for each BTN within a LEC from which the phone service is migrating to the local telephone company processing system (act 410). During act 408, order management subsystem 106 may send a duplicate copy of the one or more orders to customer service profile subsystem 108 or may send one or more messages that include the customer and order information in a different format to customer service profile subsystem 108. The format of the message(s) may be based on the particular requirements of customer service profile subsystem 108 and may be used to simplify the processing performed by customer service profile subsystem 108.

Order management subsystem 106 may then wait for messages from the local telephone company processing system indicating the status of the one or more orders (act 412). The status may include order completed, problem report, problem solved, etc. After receiving a status message from the local telephone company, order management subsystem 106 may update its copy of the status of the order (act 414) and may forward the status message to customer service profile subsystem 108 (act 416). In the case of the order being associated with more than one sub-account, order management subsystem 106 may update the state of each sub-account.

Order management subsystem 106 may then determine whether a message indicating that the order is completed was received for all sub-accounts corresponding to the cluster account (act 418). If some sub-accounts have outstanding orders, then processing may proceed to act 412 to wait for order status messages from the local telephone company. Otherwise, processing of the customer's order is completed.

Customer Service Profile Subsystem

Figure 5:
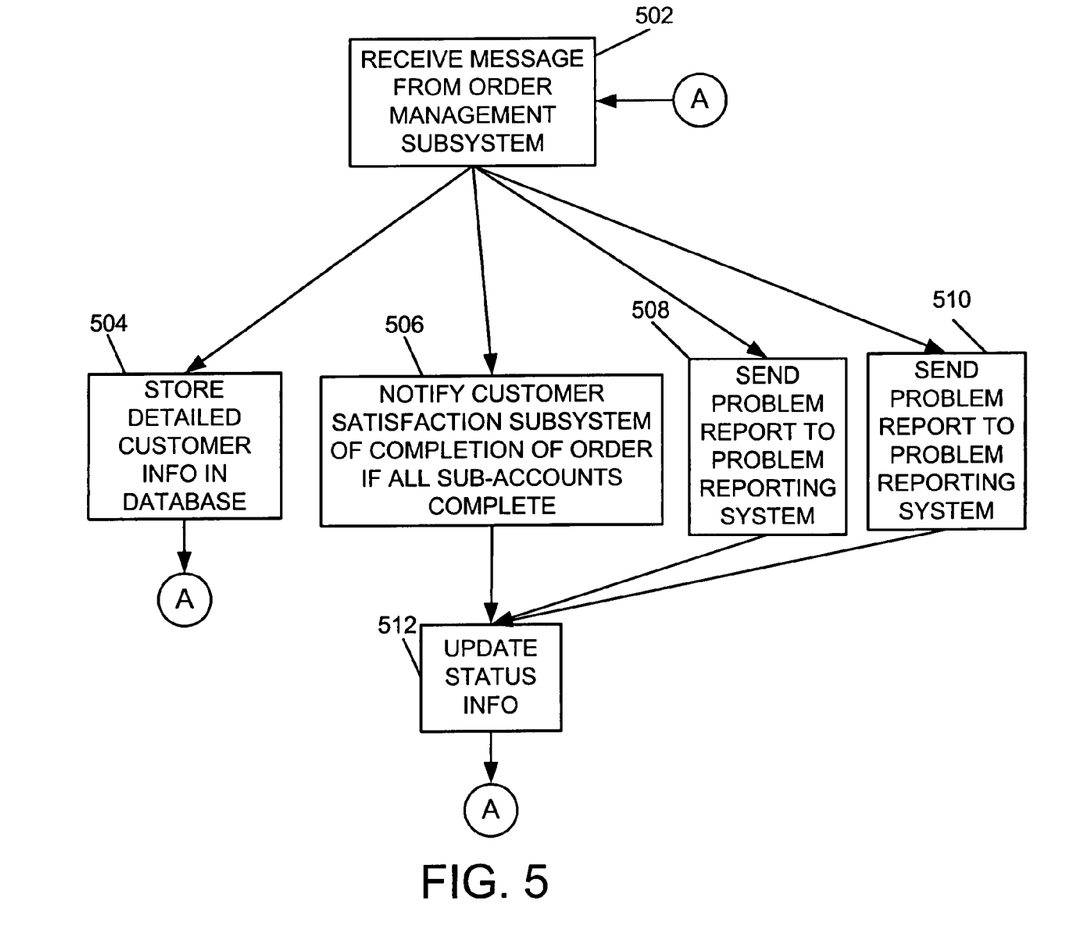
FIG. 5 is a flowchart that illustrates exemplary processing associated with the customer service profile subsystem consistent with the principles of the invention.

FIG. 5 is a flowchart that illustrates exemplary processing associated with customer service profile subsystem 108 consistent with the principles of the invention. Customer service profile subsystem 108 may receive a message from order management subsystem 106 (act 502). If the received message is customer and order information, customer service profile subsystem 108 may create a detailed record of the customer and related order information and may store the record in a customer database (act 504). If the received message is a status message indicating completion of an order, then customer service profile subsystem 108 may determine whether all orders for sub-accounts associated with the cluster account have been completed. If all of the orders associated with the cluster account have completed, then customer service profile subsystem 108 may send a message to customer satisfaction subsystem 110 informing customer satisfaction subsystem 110 that the order for the cluster account is completed (act 506). Customer service profile subsystem 108 may then update and maintain the status of the order (act 512). If the received message is a problem report or a problem solved report, customer service profile subsystem 108 may send the problem report to a problem reporting system (acts 508 and 510, respectively) and update the status information (act 512). Customer service profile subsystem 108 may then repeat acts 502-512 for additional messages.

Customer Satisfaction Subsystem

Figure 6:
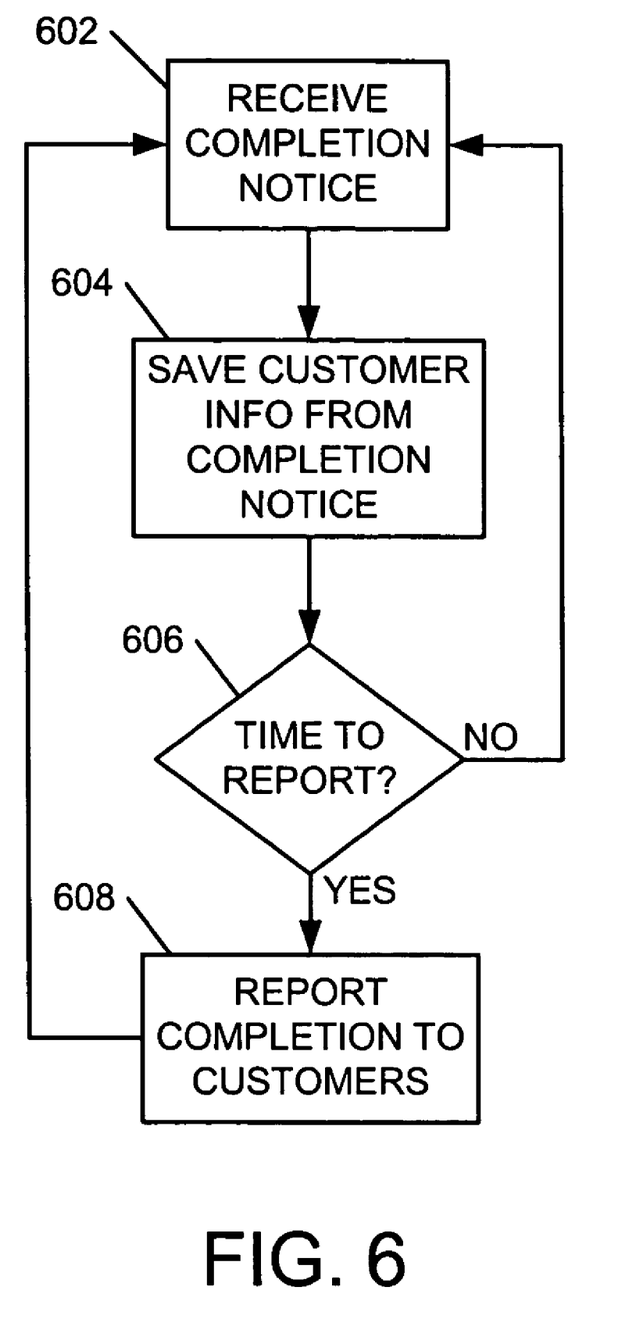
FIG. 6 is a flowchart that illustrates exemplary processing associated with the customer satisfaction subsystem consistent with the principles of the invention.

FIG. 6 is a flowchart that illustrates exemplary processing associated with customer satisfaction subsystem 110 consistent with the principles of the invention. Processing may begin with customer satisfaction subsystem 110 receiving a message, such as a completion notice from customer service profile subsystem 108 (act 602). Customer satisfaction subsystem 110 may save the customer information and may save order information in a medium, such as a memory or a disk (act 604). Customer satisfaction subsystem 110 may accumulate completion notices and may periodically determine whether it is time to report order completions (act 606). If customer satisfaction subsystem 110 determines that it is not time to report order completions, then customer satisfaction subsystem 110 may repeat acts 602-606. If customer satisfaction subsystem 110 determines that it is time to report order completions, then customer satisfaction subsystem 110 may report order completions (act 608). For example, customer satisfaction subsystem 110 may print postcards to mail to customers. Alternatively, customer satisfaction subsystem 110 may e-mail completion notices to customers or may send voice messages, such as computer-generated voice messages, to customers indicating that their order is complete.

Conclusion

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain aspects have been described as implemented in software, other configurations may be possible.

While series of acts have been described with regard to FIGS. 3-6, the order of the acts is not critical. In addition, acts described above as being performed by one device/subsystem may alternatively be performed by another device/subsystem. Further, in still other alternative implementations, a single device/subsystem may perform all of the acts described above as being performed by a number of devices/subsystems. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A computer-implemented method for migrating telephone service, comprising:
   receiving, by a processor, an order to migrate telephone service to a competitive local exchange carrier for at least one telephone line assigned to a customer;
   creating, by the processor, an account for the order;
   creating, by the processor, at least one sub-account associated with the account, each of the at least one sub-account being associated with a different combination of a billing telephone number and a local exchange carrier from which the telephone service is being migrated;
   generating, by the processor, a first telephone migration order, corresponding to at least part of the order, for migrating one or more telephone lines of the at least one telephone line associated with a first sub-account, of the at least one sub-account, corresponding to a first combination of a billing telephone number and a local exchange carrier; and
   migrating the telephone service by sending, by the processor, the first telephone migration order.

2. The method of claim 1, further comprising:
   generating, by the processor, a second telephone migration order, corresponding to at least another part of the order, for migrating one or more telephone lines of the at least one telephone lines associated with a second combination of a billing telephone number and a local exchange carrier; and
   sending, by the processor, the second telephone migration order.

3. The method of claim 1, further comprising:
   receiving, by the processor, order information including at least one automatic number identifier associated with the at least one telephone line;
   accessing a local exchange carrier database to determine an association of the at least one automatic number identifier with at least one local exchange carrier and at least one billing telephone number; and
   creating, by the processor, the first telephone migration order based on the order information and including association information of the at least one automatic number identifier with the at least one local exchange carrier and the at least one billing telephone number.

4. The method of claim 1, further comprising:
   receiving, by the processor, a notification of completion of a telephone migration order;
   determining, by the processor, whether a notification of completion for each of the at least one sub-account associated with the account has been received; and
   notifying the customer that the order is completed when it is determined that the notification of completion for each of the at least one sub-account associated with the account has been received.

5. The method of claim 4, where the notifying the customer comprises printing a postcard for mailing.

6. The method of claim 4, where the notifying the customer comprises sending an e-mail to the customer.

7. The method of claim 4, where the notifying the customer comprises sending a voice message to the customer.

8. The method of claim 1, further comprising:
   sending, by the processor, at least some of the information from the received order to a subsystem;
   creating, in the subsystem, a detailed record of customer and related order information; and
   storing the detailed record in a database.

9. An apparatus for placing an order to migrate telephone service to a competitive local exchange carrier for a plurality of telephone lines assigned to a customer, the apparatus comprising:
   a memory; and
   a processor to communicate with the memory, where:
   the memory includes a plurality of instructions for the processor such that when the instructions are executed by the processor, the apparatus is to:
      receive an order to migrate the telephone service, for a plurality of telephone lines assigned to a customer, from at least one local exchange carrier to a single competitive local exchange carrier,
      create an account corresponding to the order,
      create at least one sub-account associated with the account, each one of the at least one sub-account corresponding to a different combination of a billing telephone number and a local exchange carrier, from which the telephone service is being migrated, and
      migrate the telephone service by sending at least one telephone migration order to a local telephone company processing system, each of the at least one telephone migration order corresponding to a different one of the at least one sub-account.

10. The apparatus of claim 9, where:
    the order to migrate the telephone service includes information based on at least one automatic number identifier included with order information, and the apparatus is further to:
    associate each of the telephone lines with one of the at least one local exchange carrier, from which the telephone service is migrating, and one of at least one billing telephone number based on the at least one automatic number identifier.

11. The apparatus of claim 9, where the apparatus is further to:
    receive a notification of completion, corresponding to one of the sub-accounts, from the local telephone company processing system, and
    send the notification of completion corresponding to the one of the sub-accounts to a subsystem.

12. The apparatus of claim 9, where the apparatus is further to:
    send at least some information from the order to migrate the telephone service to a subsystem.

13. A computer-implemented system for ordering a migration of telephone service for a customer from at least one local exchange carriers to a single competitive local exchange carrier, the system comprising:
    a first subsystem to:
       receive an order to migrate the telephone service for the customer from the at least one local exchange carrier to the single competitive local exchange carrier,
       create an account for the order,
       create at least one sub-account associated with the account, each one of the at least one sub-account corresponding to a different combination a local exchange carrier and a billing telephone number, and migrate the telephone service by sending at least one telephone migration order to a local telephone company processing system, each one of the at least one telephone migration order corresponding to a different one of the sub-accounts.

14. The system of claim 13, further comprising:
a second subsystem to:
receive order information,
create the order from the order information, and
send the order to the first subsystem.

15. The system of claim 14, where:
the order information includes at least one automatic number identifier, and when creating the order from the order information, the second subsystem is further to:
access a local exchange carrier database to identify at least one local exchange carrier and at least one billing telephone number based on the at least one automatic number identifier, and
create the order based on the order information, the identified at least one local exchange carrier and the at least one billing telephone number.

16. The system of claim 13, further comprising:
a second subsystem, where:
the first subsystem is further to send at least some information from the received order to the second subsystem, and
the second subsystem is to:
receive the at least some information from the first subsystem,
generate a record of customer and related order information from the at least some information, and
store the record in a database.

17. The system of claim 13, further comprising:
a second subsystem; and
a third subsystem, where:
the first subsystem is further to:
receive a notification of completion of at least one of the telephone migration orders from the local telephone company processing system, and
send the notification of completion to the second subsystem, where the second subsystem is to:
receive the notification of completion from the first subsystem,
determine whether all of the telephone migration orders associated with the account are completed, and
send an order completion message to the third subsystem when it is determined that all of the telephone migration orders are completed, and the third subsystem is to notify the customer that the order is completed when the third subsystem receives the order completion message.

18. The system of claim 17, where the third subsystem is to notify the customer that the order is completed by printing a postcard for mailing.

19. The system of claim 17, where the third subsystem is to notify the customer that the order is completed by sending an e-mail to the customer.

20. The system of claim 17, where the third subsystem is to notify the customer that the order is completed by sending a voice message to the customer.

21. A machine-readable memory device including instructions for a processor, such that when the instructions are read and executed by the processor, the processor is to:
receive an order to migrate telephone service from at least one local exchange carrier to a competitive local exchange carrier for a plurality of telephone lines assigned to a customer;
create an account for the order;
create at least one sub-account associated with the account, each of the at least one sub-account corresponding to a different combination of a local exchange carrier and a billing telephone number; and
migrate the telephone service by sending at least one telephone migration order to a local telephone company processing system, where a number of the at least one telephone migration orders is equal to a number of the sub-accounts.

22. The machine-readable memory device of claim 21, where:
the order to migrate the telephone service includes a plurality of automatic number identifiers, and the processor is further to:
associate each of the telephone lines with one of the at least one local exchange carrier and at least one billing telephone number based on the automatic number identifiers.

23. The machine-readable memory device of claim 21, where the processor is further to:
receive a status message from the local telephone company processing system, and
forward the status message to a subsystem.

24. The machine-readable memory device of claim 21, where the processor is further to:
send at least some of the information from the received order to a subsystem for storage in a database.

* * * * *